(12) United States Patent
Schelinski et al.

(10) Patent No.: US 7,469,834 B2
(45) Date of Patent: Dec. 30, 2008

(54) SCANNER AND METHOD FOR OPERATING A SCANNER

(75) Inventors: Uwe Schelinski, Dresden (DE); Michael Scholles, Dresden (DE); Alexander Wolter, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 220 days.

(21) Appl. No.: 11/333,644

(22) Filed: Jan. 17, 2006

(65) Prior Publication Data

US 2006/0158662 A1    Jul. 20, 2006

(30) Foreign Application Priority Data

Jan. 17, 2005  (DE) .................. 10 2005 002 190

(51) Int. Cl.
*G06K 7/10* (2006.01)
(52) U.S. Cl. .................. 235/462.35; 235/462.25
(58) Field of Classification Search ............ 235/462.35, 235/462.01–462.34; 356/602
See application file for complete search history.

(56) References Cited

U.S. PATENT DOCUMENTS

| | | | |
|---|---|---|---|
| 5,546,189 A | 8/1996 | Svetkoff et al. | |
| 5,654,800 A | 8/1997 | Svetkoff et al. | |
| 6,215,481 B1 * | 4/2001 | Tanijiri et al. | 345/207 |
| 6,421,132 B1 * | 7/2002 | Brajovic | 356/602 |
| 6,486,963 B1 | 11/2002 | Holec | |
| 6,501,554 B1 | 12/2002 | Hackney et al. | |
| 6,595,055 B1 | 7/2003 | Schenk et al. | |
| 6,611,343 B1 | 8/2003 | Frankowski | |

(Continued)

FOREIGN PATENT DOCUMENTS

CA    2 376 103 A1    3/2001

(Continued)

OTHER PUBLICATIONS

Harald Schenk et al.: "A Resonantly Excited 2D-Micro-Scanning-Mirror With Large Deflection", *Sensors & Actuators*, vol. A89, 2001, No. 1-2, pp. 104-111.

(Continued)

*Primary Examiner*—Thien M Le
(74) *Attorney, Agent, or Firm*—Laurence A. Greenberg; Werner H. Stemer; Ralph E. Locher (57) ABSTRACT

A scanner for providing a possibility of detecting a surface relief of an object includes a projector configured to guide a light beam in an illumination line over the surface relief to obtain an illuminated location on the surface relief, the projector being further configured to output a projection signal from which a position of the light beam in the illumination line is derivable. Additionally, the scanner includes a collector having a collector micro mirror stimulatable to oscillate in two dimensions and a point-shaped light detector, the collector micro mirror being oscillatingly arranged in a first direction of the illumination line and in a second direction differing from the first direction such that a reflection of the illuminated location within a scan area of the micro scanner mirror is imagable by it onto the point-shaped light detector, and the collector being configured to output a detection signal from which a position of the illuminated location in the first and second directions is derivable.

12 Claims, 8 Drawing Sheets

U.S. PATENT DOCUMENTS

| | | |
|---|---|---|
| 2003/0202691 A1 | 10/2003 | Beardsley |
| 2004/0183149 A1 | 9/2004 | Schenk |
| 2004/0218155 A1 | 11/2004 | Schenk et al. |

FOREIGN PATENT DOCUMENTS

| | | |
|---|---|---|
| CA | 2 365 323 A1 | 6/2003 |
| DE | 195 36 294 A1 | 4/1997 |
| DE | 196 13 978 A1 | 10/1997 |
| DE | 196 15 685 A1 | 10/1997 |
| DE | 197 21 903 C1 | 7/1998 |
| DE | 197 21 688 A1 | 9/1998 |
| DE | 198 10 495 A1 | 9/1999 |
| DE | 198 46 145 A1 | 4/2000 |
| DE | 101 49 750 A1 | 9/2002 |
| DE | 103 04 187 A1 | 8/2004 |
| DE | 103 04 188 A1 | 8/2004 |
| EP | 0 999 429 A1 | 5/2000 |
| EP | 1 371 969 A1 | 12/2003 |
| WO | 98/05923 | 2/1998 |
| WO | 98/12501 | 3/1998 |
| WO | 00/25170 | 5/2000 |
| WO | 00/77471 A1 | 12/2000 |
| WO | 03/010545 A1 | 2/2003 |
| WO | 03/032046 A1 | 4/2003 |
| WO | 2004/068211 A1 | 8/2004 |
| WO | 2004/092745 A1 | 10/2004 |

OTHER PUBLICATIONS

Harald Schenck et al.: "A Novel Electrostatically Driven Torsional Actuator", *Proc. 3rd Int. Conf. On Micro Opto Electro Mechanical Systems, Mainz*, Aug. 30-Sep. 1, 1999, pp. 3-10.

Harald Schenk et al.: "Large Deflection Micromechanical Scanning Mirrors for Linear Scans and Pattern Generation", *Journal of Selected Topics of Quantum Electronics*, vol. 6, 2000, No. 5, pp. 715-722.

Harald Schenk et al.: "An Electrostatically Excited 2D-Micro-Scanning-Mirror With An In-Plane Configuration Of the Driving Electrodes", *Proc. MEMS 2000, 13th Int. Micro Electro Mechanical Systems Conf.*, Miyazaki, Japan, 2000, pp. 473-478.

Kai-Uwe Roscher et al.: "Driver ASIC for synchronized excitation of resonant Micro-Mirrors", MOEMS Display and Imaging Systems, Proceedings of SPIE, vol. 4985, *SPIE 2003*, pp. 121-130.

Kai-Uwe Roscher et al.: "Low cost projection device with a 2-dimensional resonant micro scanning mirror", *MEMS/MOEMS display and imaging systems II*, 2004, pp. 22-31.

Eric Gaumont et al.: "Mechanical and electrical failures and reliability of Micro Scanning Mirrors", 9th Int. Symposium on the physical and failure analysis of integrated circuits, Singapore, Jul. 8-12, 2002, *IEEE Press*, 2002, pp. 212-217.

Alexander Wolter et al.: "Improved layout for a resonant 2D Micro Scanning Mirror with low operation voltages", MOEMS Display and Imaging Systems, Proceedings of SPIE, vol. 4985, *SPIE 2003*, pp. 72-82.

Harald Schenk et al.: "A New Driving Principle For Micromechanical Torsional Actuators", Micro-Electro-Mechanical System, *MEMS*-vol. 1, Conf.: 1999 Int. Mech. Eng. Congr. & Exh., Nov. 14-19, Nashville (1999), pp. 333-338.

Peter Dürr et al.: "Micromirror Spatial Light Modulators", 3rd Int. Conference on Micro Opto Electro Mechanical Systems (Optical MEMS), *Proc. MEMS 1999*, pp. 60-65.

Alexander Wolter et al.: "Torsional stress, fatigue and fracture strength in silicon hinges of a micro scanning mirror", *SPIE Symposium*, Jan. 26-28, 2004, 10 pages.

* cited by examiner

SCANNER AND METHOD FOR OPERATING A SCANNER

CROSS-REFERENCE TO RELATED APPLICATION

This application claims priority from German Patent Application No. 10 2005 002 190.5, which was filed on Jan. 17, 2005, and is incorporated herein by reference in its entirety.

BACKGROUND OF THE INVENTION

1. Field of the Invention

The present invention relates to the technical field of contactless detection or measurement, respectively, of three-dimensional objects. In particular, the present invention relates to the technical sub-field of scanners for detecting a surface relief by means of optical scanning.

2. Description of Prior Art

Figure 7:
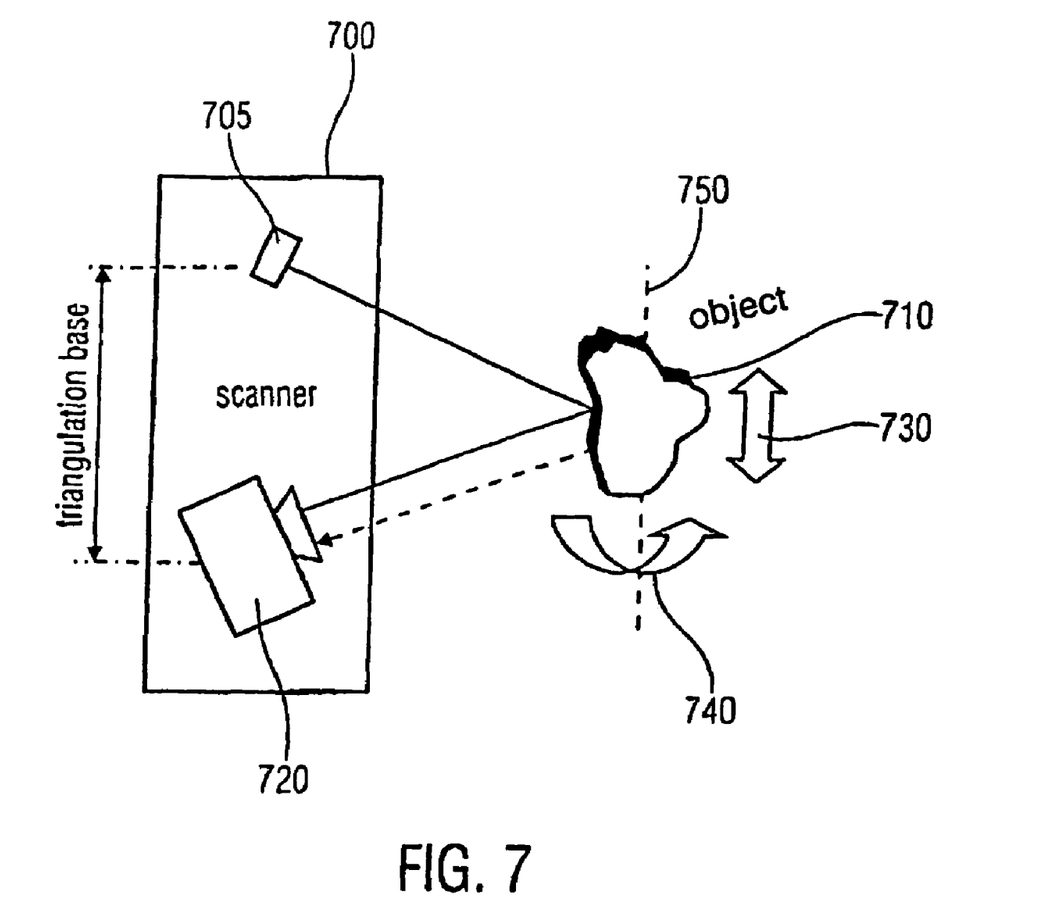
FIG. 7 shows a schematic illustration of the triangulation principle of a conventional scanner.

Known scanners for short object distances mainly use the method of triangulation, as it is illustrated in FIG. 7. Here, from a light source 705 of a scanner 700 a suitable light pattern is protected onto the object 710 to be examined, while an electronic image receiver 720 detects the resulting image from a different angle of view. As it is illustrated in FIG. 7, the surface profile of the object 710 that may be twisted or shifted, respectively, in different directions 730 and 740, leads to an offset of the projected light pattern with regard to a reference level 750, from which object coordinates may be calculated via image processing algorithms. A complete spatial module of the object 710 may be obtained when the object 710 and the scanner 700 are moved in a defined way relatively to each other. FIG. 7 thus shows a 3D scanner operating according to the triangulation principle. Depending on the application, different light sources are used, like for example traditional projectors having shadow masks for structuring (e.g. DE 000010149750 A1, US 00006501554 B1) or laser light sources corresponding for example to DE 000019721688 A1. Also light sources having attachment optics for generating light figures according to DE 000019615685 A1 or ones having DMD members (DMD=Digital Micro Device) may be used for generating electronically controllable light figures, for example according to EP 000000927334 B1, US 000006611343 B1, DE 000019810495 A1. Any known devices of those classes use laminar (DE 000010149750 A1 or DE 000019615685 A1) or at least line-shaped image sensors (at it is for example disclosed in US 000006501554 B1) as image receivers, however, on the basis of CCD or CMOS technology (CCD=Charge Coupled Device=sensor type that accumulates electrical charges under light incidence that are fed to suitably controlled electrodes of a read-out electronic; CMOS=Complementary Metal Oxide Semiconductor=widely used circuit technology and manufacturing technology for integrated solid circuitries on a silicon basis).

Recently, with the so-called micro scanner mirrors new elastically suspended micro optical members electro-statically excited close to their natural resonance and the associated control electronics are available, as it is for example explained in more detail in the following documents:

A New Driving Principle for Micromechanical Torsional Actuators

H. Schenk, P. Dürr, D. Kunze, H. Kück; Micro-Electro-Mechanical System, MEMS-Vol. 1, Conf.: 1999 int. Mech. Eng. Congr. & Exh., 14-19 Nov. 1999, Nashville, p. 333-338, 1999

A Novel Electrostatically Driven Torsional Actuator

H. Schenk, P. Dürr, H. Kück Proc. $3^{rd}$ Int. Conf. On Micro Opto Electro Mechanical Systems, Mainz, 30. Aug.-1. Sep. 1999, page 3-10, 1999

Micromirror Spatial Light Modulators

P. Dürr, A. Gehner, U. Dauderstädt, $3^{rd}$ International Conference on Micro Opto Electro Mechanical Systems (Optical MEMS) Proc. MEMS 1999, Mainz, 1999, S. 60-65

A Resonantly Excited 2D-Micro-Scanning-Mirror with Large Deflection

H. Schenk, P. Dürr, D. Kunze, H. Lakner, H. Kück Sensors & Actuators, 2001 Sensors & Actuators, A 89 (2001), Nr. 1-2, ISSN 0924-4247, S. 104-111

Large Deflection Micromechanical Scanning Mirrors for Linear Scans and Pattern Generation H. Schenk, P. Dürr, T. Haase, D. Kunze, U. Sobe, H. Lakner, H. Kück Journal of Selected Topics of Quantum Electronics 6, (2000), Nr. 5 ISSN 1077-260X, S. 715-722

An Electrostatically Excited 2D-Micro-Scanning-Mirror with an In-Plane Configuration of the Driving Electrodes H. Schenk, P. Dürr, D. Kunze, H. Lakner, H. Kück Proc. MEMS 2000, 13th Int. Micro Electro Mechanical Systems Conf, Miyazaki, Japan, page 473-478, 2000

Mechanical and Electrical Failures and Reliability of Micro Scanning Mirrors

E. Gaumont, A. Wolter, H. Schenk, G. Georgelin, M. Schmoger 9th Int. Symposium on the physical and failure analysis of integrated circuits (IPFA 9), 8-12 Jul. 2002, raffles City Convention Centre, Singapore, Proc. New York, IEEE Press, 2002, ISBN 0-7803-7416-9, S. 212-217

Improved Layout for a Resonant 2D Micro Scanning Mirror with Low Operation Voltages A. Wolter, H. Schenk, E. Gaumont, H. Lakner, SPIE Conference on MOEMS Display and Imaging Systems (mf07), 28-29 Jan. 2003, San Jose, Calif., USA, Proceedings, Bellingham, Wash.: SPIE, 2003 (SPIE Proceedings Series 4985) ISBN 0-8194-4785-4, S. 72-74

US020040183149A1

Micromechanical device

WO002003010545A1

Mikromechanisches Bauelement (Micro-mechanical device)

WO002000025170A1, Mikromechanisches Bauelement Mit Schwingkorper (Micro-mechanical Device With Vibrating Body) EP000001123526B1, US000006595055B1

WO002004092745A1

Mikromechanisches Bauelement Mit Einstellbarer Resonanzfrequenz (Micro-mechanical Device With Settable Resonance Frequency)

Driver ASIC for Synchronized Excitation of Resonant Micro-Mirror

K.-U. Roscher, U. Fakesch, H. Schenk, H. Lakner, D. Schlebusch, SPIE Confernece on MOEMS Display and Imaging Systems (mf07), 28-29 Jan. 2003, San Jose, Calif., USA, Proceedings, Bellingham, Wash.: SPIE, 2003 (SPIE Proceedings Series 4985) ISBN 0-8194-4785-4, S. 121-130

The class of MOEMS (MOEMS=Micro Opto Electromechanical Systems) allow to deflect light beams in an electronically controlled way one- or two-dimensional so that using points-shaped light sources or detector elements, respectively, an area or a solid angle may sequentially be scanned or sweeped (scanning).

For projection purposes the use of resonant micro-mirrors already represents a known solution, which may for example be seen from the following documents:

DE 000019615685 A1

Low Cost Projection Device with a 2-Dimensional Resonant Micro Scanning Mirror

K.-U. Roscher, H. Grätz, H. Schenk, A. Wolter, H. Lakner MEMS/MOEMS display and imaging systems II (2004), pp. 22-31

WO002003032046A1, Projektionsvorrichtung
US020040218155A1,

Also the projection purposes mirrors are used in another way, for example moved in a rotating way according to DE 000010304187A1, DE000010304188A1 and WO002004068211A1 or be already mentioned DMD members according to EP 000000927334B1, US00000661134B1 or DE 000019810495A1 for generating light patterns.

One possibility for a one-dimensional detection of a position of a light beam was presented in "Torsional stress, fatigue and fracture strength in silicon hinges of a micro scanning mirror" of A. Wolter, H. Schenk, H. Korth and H. Lackner (SPIE Bellingham Wash. 2004; Proceedings of SPIE Vol. 5343). This one-dimensional detection of a position of a light beam only offers a coarse and delayed possibility for a determination of the position of the light beam, as the described method requires a complete pass of the light beam between two oscillation amplitude maxima of a travel path of the light beam.

Further, for the application area of the following invention, still the further documents are relevant:

EP000000999429A1 Messinstrument für 3D Form mit Laser Scanner und Digitalkamera (Measurement Instrument for 3D-form with laser scanner and digital camera US020030202691A1 Calibration of multiple cameras for a turntable-based 3D scanner US000006486963B1 Precision 3D scanner base and method for measuring manufactured parts DE000019846145A1 Verfahren und Anordnung zur 3D-Aufnahme (Method and Arrangement for 3D-Recording)

DE000019613978A1 Verfahren zum Zusammenfügen der Messdaten unterschiedlicher Ansichten und Objektbereiche bei der optischen 3D-Koordinatenmeßtechnik mittels flächenhaft und auf der Basis von Musterprojekten arbeitenden Triangulationssensoren (Method for joining the measurement data of different views and object areas in the optical 3D-coordinate measurement technology by means of triangulation sensors operating in a laminar way and on the basis of sample projection)

DE000019536287A1 Verfahren zur geometrischen Kalibrierung von optischen 3D-Sensoren zur dreidimensionalen Vermessung von Objekten und Vorrichtung hierzu (Method for a geometric calibration of optical 3D sensors for a 3-dimensional measurement of objects and devices for the same)

DE000019536294A1 Verfahren zur geometrischen Navigation von optischen 3D-Sensoren zum dreidimensionalen Vermessen von Objekten (Method for a geomectrical navigation of optical 3D sensors for a 3-dimensional measurement of objects)

EP000001371969A1 Ausrichtungsverfahren zum Positionieren von Sensoren für 3D-Meβsysteme (Alignment method for positioning sensors for 3D measurement systems)

WO002000077471A1 Vorrichtung zur Berührungslosen Dreidimensionalen Vermessung von Körpern und Verfahren zur Bestimmung eines Koordinatensystems für Messpunktkoordinaten (Device for a contactless 3-dimensional measurement of bodies and methods for determining a coordinate system for measurement point coordinates)

EP000000916071B1 Triangulation-Based 3D Imaging And Processing Method And System US000005546189A Triangulation-based 3D imaging and processing method and system US000005654800A Triangulation-based 3D imaging and processing method and system WO001998005923A1 Triangulation-Based 3D Imaging And Processing Method And System CA000002365323A1 Method Of Measuring 3D Object And Rendering 3D Object Acquired By A Scanner DE000019721903C1 Verfahren und Anlage zur meβtechnischen räumlichen 3D-Lageerfassung von Oberflächenpunkten (Method and apparatus for a measurement-technical spatial 3D position detection of surface points)

CA000002376103A1 Active Structural Scanner For Scanning In 3D Mode Data Of Unknown Structures However, all these prior-art approaches are of disadvantage in that they require either an area camera or at least a line camera for detecting the image reflected by the object or may only detect a position of the image by means of a complicated control of micro mirrors having micromechanical electric motors in order to detect the three-dimensional surface relief therefrom. In addition, the solution of the complicated control of the micro mirrors has the additional disadvantage that this control is mechanically sensitive, area-consuming and, additionally, expensive. Also, using an area or line camera requires considerable space and is also expensive.

SUMMARY OF THE INVENTION

Thus, it is an object of the present invention to provide a possibility of detecting a three-dimensional surface relief, wherein this possibility should, compared to the prior art, have a better resolution and be cheaper, mechanically more robust and consume less space.

In accordance with a first aspect, the present invention provides a scanner for providing a possibility of detecting a surface relief of an object, having: a projector configured to guide a light beam in an illumination line over the surface relief to obtain an illuminated location on the surface relief, the projector also being configured to output a projection signal from which a position of the light beam in the illumination line is derivable; and a collector having a collector micro mirror stimulatable to oscillate in two dimensions and a point-shaped light detector, the collector micro mirror being oscillatingly arranged in a first direction of the illumination line and in a second direction differing from the first direction such that a reflection of the illuminated location within a scan area of the collector micro mirror is imagable by it onto the point-shaped light detector, and the collector being configured to output a detection signal from which a position of the illuminated location in the first and second directions is derivable.

In accordance with a second aspect, the present invention provides a method for operating a scanner for providing a possibility of detecting a surface relief of an object, the scanner having a projector configured to guide a light beam in an illumination line over the surface relief to obtain an illuminated location on the surface relief, the projector further being configured to output a projection signal from which a position of the light beam in the illumination line is derivable; and having a collector having a collector micro mirror stimulatable to oscillate in two dimensions and a point-shaped light detector, the collector micro mirror being oscillatingly arranged in a first direction of the illumination line and in a second direction differing from the first direction such that a reflection of the illuminated location within a scan area of the collector micro mirror is imagable by it onto the point-shaped light detector, and the collector being configured to output a detection signal from which a position of the illuminated location in the first and second directions is derivable, wherein the method has the following steps: providing and guiding, in the shape of lines, the light beam in an illumination line over the surface relief of the object to obtain an illuminated location on the surface relief, the step of guiding the light beam also including determining a position of the light beam in the illumination line and outputting a projection signal from which the position of the light beam in the illumination line is derivable; and detecting a position of the illuminated location using the collector micro mirror stimulated to oscillate in two dimensions and the point-shaped light detector, the step of detecting including imaging a reflection of the illuminated location onto the light detector by means of the collector micro mirror oscillating in the first and second directions, and the step of detecting also including outputting a detector signal from which the position of the illuminated location in the first and second directions is derivable.

In accordance with a third aspect, the present invention provides a computer program having a program code for performing the above-mentioned method when the computer program runs on a computer The present invention is based on the idea of illuminating in the shape of lines, by the projector, the surface relief to be detected by a light beam in an illumination line such that a light point is guided over the surface relief in the shape of lines. It is now possible by means of the collector having the collector micro mirror stimulatable to oscillate in two dimensions and the point-shaped light detector to detect the position of the light point on the surface relief in a direction of the illumination line and also in a direction arranged perpendicularly thereto in a reference plane of the object, wherein, by means of the alterable height profile of the surface relief, the reflection of the light point on the surface relief cannot only be detected in the direction of the illumination line, but also in a direction perpendicular to the illumination line. Knowing the position of the light beam in the illumination line, the height profile of the surface relief may be calculated from the offset of the light point compared to an axis defined by the illumination line.

Advantageously, the surface relief of an object can be detected through knowing the position of the reflection of the light point on the surface relief and information on a position of the light beam in the illumination line, and at the same time this detection of the surface relief may be executed in an area-saving, cheap and mechanically robust way. The inventive approach may be realized in an area-saving way particularly because area cameras or line cameras need no longer be used, but a very compact setup of the collector is possible through the collector mirror stimulatable to oscillate in connection with the point-shaped light detector. Another advantage of the inventive approach is that a complicated and thus expensive control of the collector micro mirror, as would, for example, be possible by means of small electric motors, is no longer required due to the usage of a collector micro mirror stimulatable to oscillate. Furthermore, the inventive approach has the advantage that, by avoiding the area or line camera, a considerably cheaper detection unit, such as, for example, in the form of an individual photodiode, may be employed, which is how the manufacturing costs of a corresponding collector may be reduced. The fact that a complicated control by means of, for example, micromechanical electric motors, may be omitted, allows a considerably mechanically more robust construction.

BRIEF DESCRIPTION OF THE DRAWINGS

In the following, some embodiments of the present invention are explained in more detail with reference to the accompanying drawings, in which:

FIG. 4b shows a diagram for illustrating received signals of a photo diode when using the shutter illustrated in FIG. 4a;

In the Figures, same or similar elements are designated by same or similar reference numerals, wherein a repeated description for those elements is omitted.

DESCRIPTION OF PREFERRED EMBODIMENTS

Figure 1:
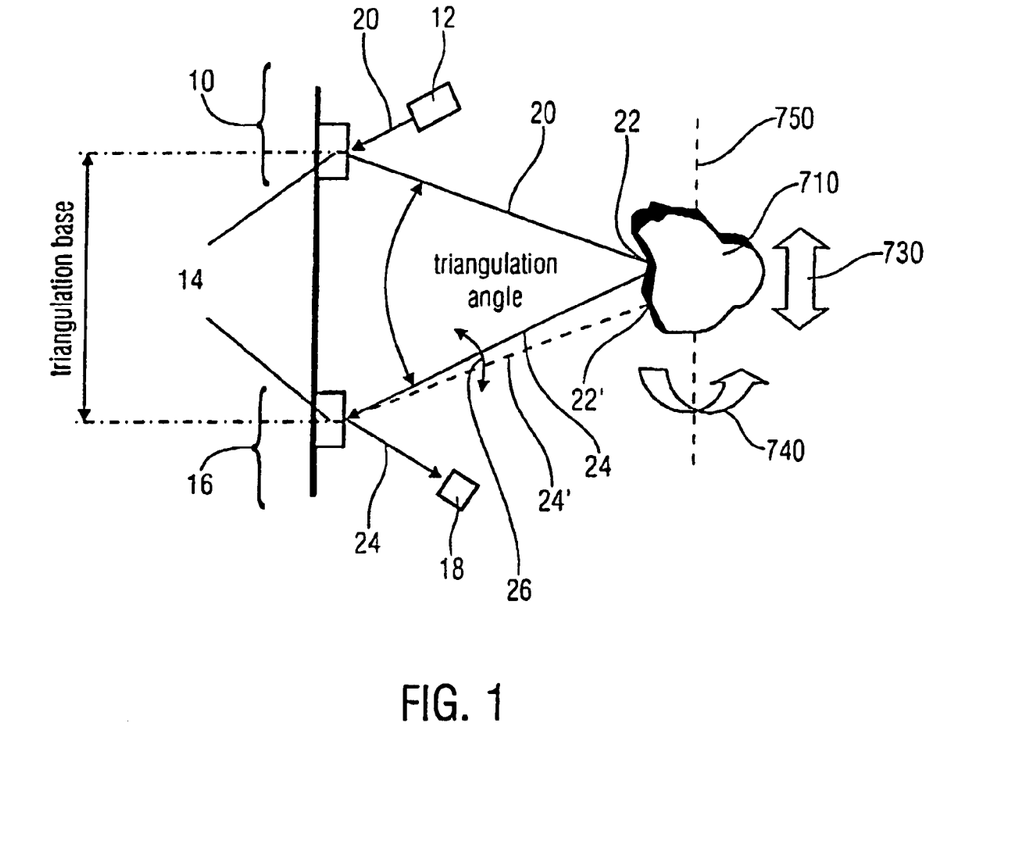
FIG. 1 shows a schematic illustration of a first embodiment of the present invention.

The first embodiment of the inventive scanner is schematically illustrated in FIG. 1. Here, FIG. 1 includes a projector 10 having a light source 12 and a projector micro scanner mirror 14 and a collector 16 having a collector micro mirror 14 and a photo-sensor 18. The two micro mirrors 14 of the projector 10 and the collector 16 are thus arranged at a distance from each other that serves as a triangulation basis. Via the light source 12, which is preferably a point-shaped light source, a light beam is directed to the micro mirror 14 of the projector 10, wherein the same reflects the light beam 20 to the object 710, whereby the light point or the illuminated location 22, respectively, results. The illuminated location 22 now forms a reflection 24 which is mapped from the micro mirror 14 of the collector 16 on the preferably point-shaped light detector 18, which may for example be a photo diode. Accordingly, the light source 12 may be an LED (LED=Light Emitting Diode) or a laser diode. If the object 71 is now moved, as it is for example illustrated by the movement directions 73 and 74, with a constant illumination using the light beam 20 the position of the illuminated location 22 for example shifts toward the position 22', whereby a further reflection 24' is formed which impinges at the micro mirror 14 of the collector 16 offset with regard to the reflection 24 by an angle 26. By a two-dimensional oscillation of the micro mirror 14 of the collector 16 now a certain section of the surface or of the surface relief, respectively, of the object 710 may be scanned, whereby also the shifting of the position of the illuminated location 22 to the shifted illuminated location 22' may be registered and from which subsequently also the surface relief of the object 710 may be determined in a signal rendering unit which is not illustrated in FIG. 1.

According to the first embodiment of the present invention, micro mirrors may thus be used, when applying the known triangulation method, as a scanner for the 3D detection of objects. Micro scanner mirrors find application according to the first embodiment both for a projection of a structured illumination onto the object and within the light receiver (i.e. the collector 16) for the detection of the back-scattered light.

What is new, in particular, is that, for the image acquisition in the collector, a point-shaped light detector 18 (or also light sensor) is used in combination with a two-dimensional oscillating micro mirror which defines the respective "viewing direction" of the detector via its momentary displacement. Corresponding to FIG. 1, point-shaped light sources such as a laser diode may thus for example be used on the projector side and point-shaped detectors such as photodiodes may be used on the collector side. However, it is to be noted that the combination of an oscillating micro mirror with a point-shaped light detector on the detector side is particularly advantageous as, due to the two-dimensional oscillation, i.e. the displacement of the mirror in two dimensions for detecting a sector on the reference plane, it is particularly cost-effective, increases robustness and saves space, because particularly the two-dimensional tilting and corresponding controlling of conventional micro scanner mirrors implies a lot of effort and thus cost, is mechanically susceptible to failure and needs a lot of space due to the use of corresponding control elements. However, the implementation of the projector with a point-shaped light source and a corresponding micro scanner mirror which may be oscillated one-dimensionally is merely a preferred embodiment, it is not indispensable for the desired advantages, because one-dimensional control does not involve as much effort as two-dimensional control. In other words, a micro mirror which may be stimulated to oscillations one-dimensionally is not necessarily required in the projector for achieving the desired advantages according to the invention, the projector may rather also be constructed differently to take a light beam in an illumination line across the surface relief. In the following discussion, however, for illustrative reasons, an embodiment will be further described which also uses a micro scanner mirror in the projector, without limiting generality. Due to the advantages described above, it is now possible to realise a 3D scanner of low cost and compact design.

In order to detect the surface relief of the object to be scanned, there will further be used a procedure as explained in more detail in the following. When using micro mirrors, for example for the illumination of the object and for the detection of the backscattered light, what must basically be taken into consideration is that each of the oscillating mirrors is only directed to exactly one point (spot) of the object at any time. Therefore, it is preferred that both mirrors are controlled such that the detector may detect the spot generated by the projector on the surface relief of the object.

Figure 2:
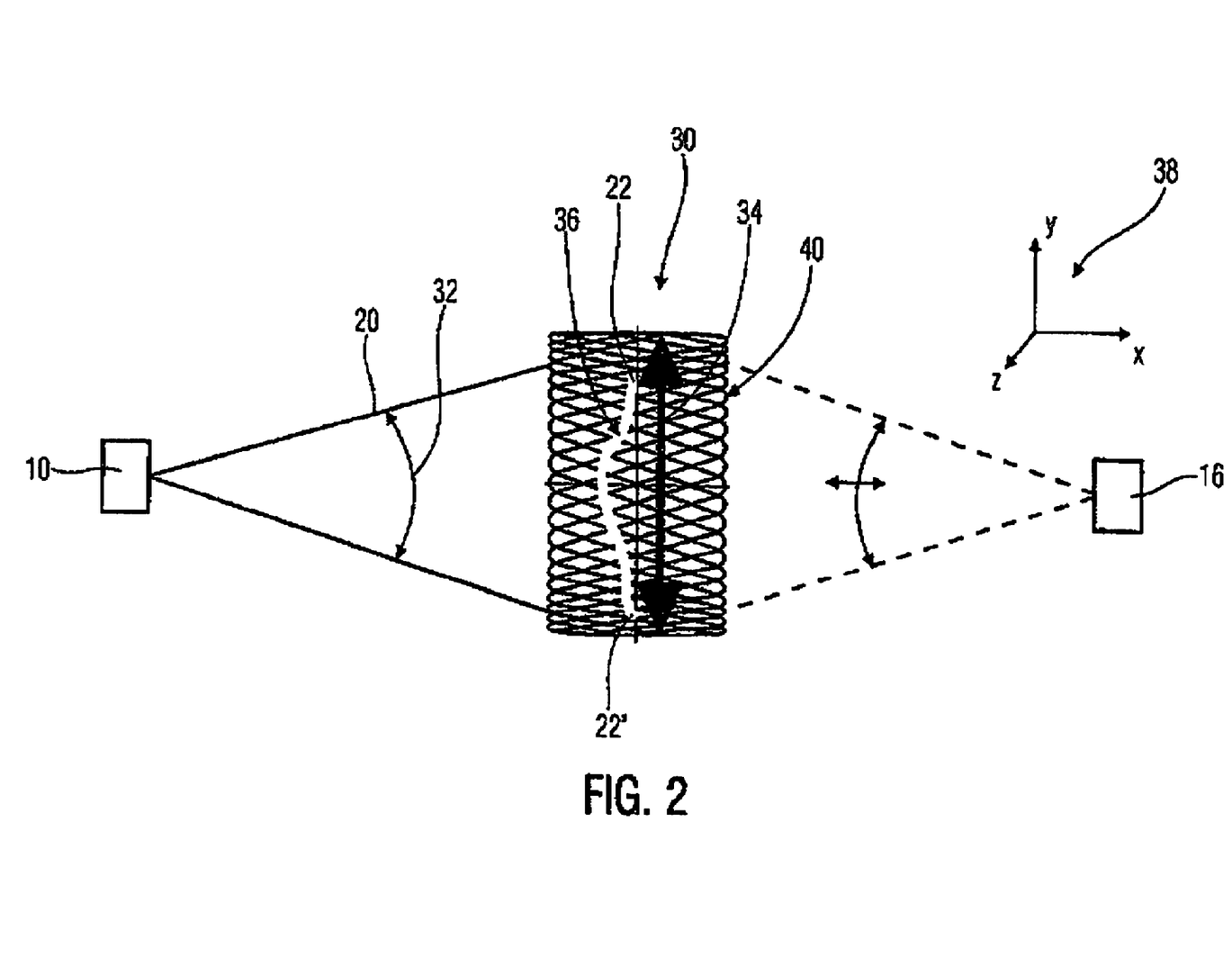
FIG. 2 shows a schematic illustration of the sampling of a surface area of the object.

In order to detect this generated spot (i.e. the illuminated place marked with the reference numerals 22 or 22', respectively, in FIG. 1), the following method for controlling the micro scanner mirrors may be used as described with respect to FIG. 2. It is to be noted that the embodiment of the projector with a micro scanner mirror represents a preferred embodiment, wherein, however, there may also be used a projector with which a differently designed line-shaped illumination of the surface relief of the object is possible. However, the following method will be described in more detail using a micro scanner mirror.

FIG. 2 shows a projector 10 for line-wise illumination of a sector 30 of the surface relief of the object to be scanned. The light beam 20 is taken across the sector 30 of the surface relief along the displacement angle 32 such that the light beam 20 illuminates the surface relief in an illumination line 34. When illuminating the surface relief in the sector 30, the height profile yields a trace 36 of the light points 22 and 22' whose horizontal displacement may be determined by the collector 16. In other words, the light beam 20 may be taken across the surface relief in the illumination line 34 in the y direction of a coordinate system 38 illustrated in FIG. 2, wherein a height profile in the z direction results in a displacement of the light points 22 in the x direction. This displacement may be detected by the collector 16 by the micro mirrors being stimulated to a two-dimensional oscillation such that there is a raster scan of the sector 30 in the form of a Lissajous FIG. 40 as illustrated in FIG. 2. This two-dimensional displacement thus results in pivoting the point of the sector 30 which is formed onto the point-shaped light detector by the micro mirror of the collector 16 (not illustrated in FIG. 2).

The principle of scanning with preferably two mirrors parallel to the triangulation plane may thus be represented as follows, wherein the term "triangulation plane" means the plane defined by the centers of the image field in the reference plane and both mirrors and/or by the triangulation angle:

1. The mirror of the projector is only displaced in one, here the vertical, oscillation direction y so that the spot 22 describes a virtual line (vertical arrow and/or illumination line 34) on the reference plane.
2. The mirror of the collector is now stimulated such that it also oscillates in this direction, preferably synchronously to the projector, i.e. the momentary height position of the projected spot is "seen" on the line mentioned above. For this, a match as close as possible of the two y oscillations of the micro mirror of the projector and the micro mirror of the collector should be achieved in frequency, amplitude and phase.
3. The virtual line, i.e. the illumination line 34, is distorted to a curve 36 visible in FIG. 2 as white trace by the surface profile and/or the surface relief of the object. According to the triangulation principle, this also causes displacement of the spot 22 or 22', respectively, in the x direction which may be detected by the collector micro mirror being put into horizontal oscillations at the same time. If y oscillations of both mirrors continue to run synchronously, the wanted spot position should be found in the x direction in the scanning, if it is within the reception area determined by the horizontal amplitude.
4. Due to a superimposition of x and y oscillations, the "viewing direction" of the collector micro mirror on the point-shaped light detector describes a Lissajous figure whose shape depends on the ratio of the oscillation frequencies in the x and y directions and their phase relation. The extension of the Lissajous FIG. 40 is connected with the oscillation amplitudes in the x and y directions. For acquiring the object details, a maximum line density is to be aimed at in the Lissajous FIG. 40. In order to achieve such a line density of the resulting Lissajous FIG. 40, control of the mirror oscillation in the x and y directions may further be achieved such that a ratio of the oscillation amplitudes, the oscillation phases and the oscillation frequencies may be influenced via this mirror control, for example by means of a digital controller.
5. If the surface relief of the object has the property of a diffuse reflection of the projector spot, the light power is spread across the entire solid angle in front of the reflecting area according to Lambert's law. Thus only the radiation power reaching it directly is in principle available for a small-area detector such as the point-shaped light detector 18 in FIG. 1. In the case of a power of the radiated light beam 20 of several milliwatts as illustrated in FIG. 1 or 2, the backscattered power is in the order of 5 nanowatts per mm$^2$. Therefore, it is preferred to use a highly sensitive photosensor which processes and amplifies an analog output signal received at the light detector with low noise. For such a task, for example an electronic circuit may be used as illustrated in more detail in FIG. 3.

Figure 3:
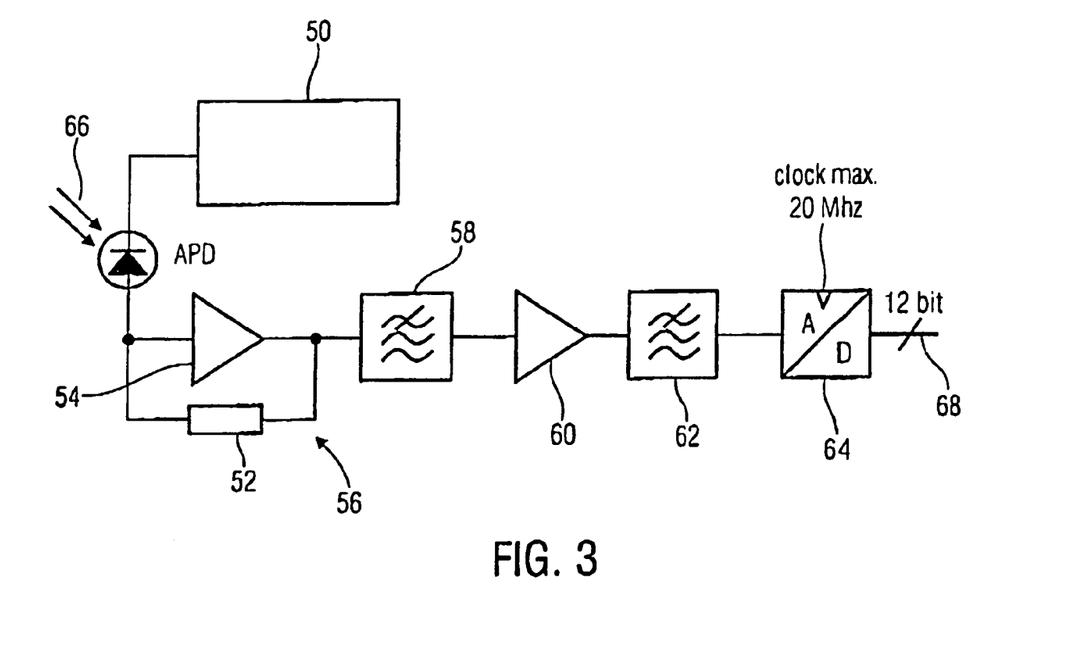
FIG. 3 shows a schematic illustration of an embodiment for a signal rendering within the collector.

FIG. 3 shows a circuitry for processing a very faint light signal comprising first a bias generating unit 32 providing a voltage of, for example, about 200 volts. This bias is then passed on to an avalanche photodiode APD which, in turn, is connected to a parallel arrangement of a resistor 52 and an amplifier 54. The parallel arrangement of the resistor 52 and the amplifier 54, which may, for example, be implemented as operational amplifier of the type OPA657, is referred to as transimpedance amplifier 56. This transimpedance amplifier 56 is then further coupled to a first lowpass 58 which, in turn, is connected to a voltage amplifier 60, for example an operational amplifier of the type OPA656. A further lowpass 62 is connected to the voltage amplifier 60, which does not necessarily have the same characteristic as the lowpass between the transimpedance amplifier 56 and the voltage amplifier 60. Finally, following the further lowpass 62, there is connected an analog-to-digital converter with, for example, a resolution of 12 bits and a maximum clock frequency of 20 MHz so that, from the faint light signal 66, an amplified digitized output signal 68 may be provided which consists of a digital stream of scans of the sensor signal. From this data stream, the positions of the illuminated places 22 or 22', respectively, may be detected, and object coordinates in three-dimensional form, i.e. the surface relief of the object, may be determined by correlation with the associated mirror positions.

Figure 4A:
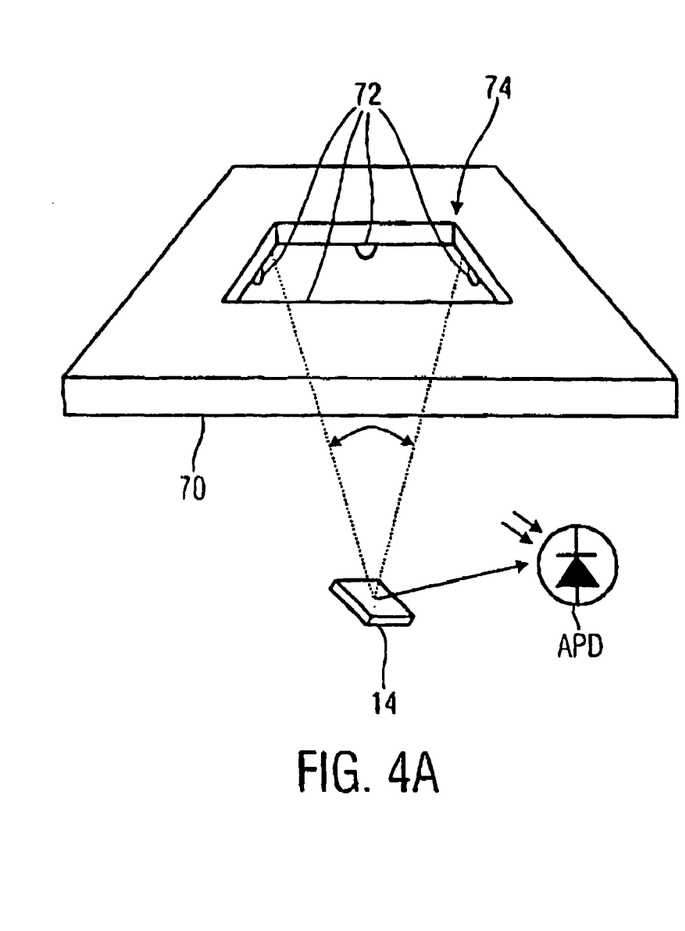
FIG. 4a shows a schematic illustration of an embodiment for a shutter of the collector.

6. In order to exactly synchronize the y oscillations of both mirrors, i.e. the micro scanner mirror of the projector and the micro scanner mirror of the detector, measuring arrangements for the amplitudes, phases and frequencies of the oscillation of the micro mirror of the projector or the micro mirror of the collector, respectively, may be added to the scanner. For this, there may, for example, be used a framelike shutter 70 provided with LEDs at the collector as illustrated in FIG. 4A. At the side facing the micro scanner mirror 14 of the collector, the framelike shutter 70 of the collector 16 comprises one or more LEDs 72 disposed on an edge of an inner aperture 74 of the shutter 70. According to the illustration in FIG. 4A, one LED 72 is disposed on each of the four inner sides of the aperture 74 of the shutter 70, wherein this one LED 72 may also be implemented in the form of an LED line along the complete inner side of the corresponding aperture portion. It is also possible that an LED or an LED line is only implemented on two opposing sides on the edge of the aperture 74.

Figure 4B:
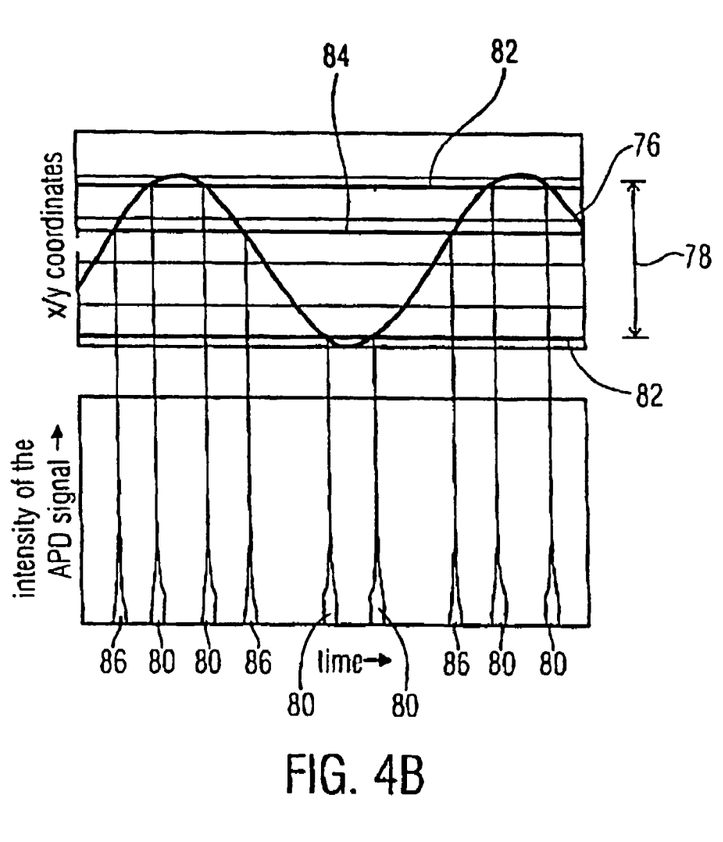

FIG. 4B illustrates in more detail how such a shutter 70 functions. For this, first an upper subdiagram of FIG. 4B illustrates the curve 76 of scanned places in x and y coordinates over time. It is to be noted that, for the basic mode of operation, only the scanning in one direction (i.e. the x direction or the y direction) needs to be illustrated as the scanning in the respective other direction is performed analogously. If a detection point within the aperture 74 illustrated in FIG. 4B is scanned by the micro scanner mirror 14, the curve 76 moves within the aperture area 78. If the micro scanner mirror 14 maps a location on the shutter frame 70 onto the photodetector APD, it sweeps the photodiodes 72 in the case of implementation of the photodiodes 72 on the edges of the aperture 74, whereby a corresponding light signal and/or a correspondingly increased intensity of the light detector signal is detectable at the light detector APD. This is apparent from the lower subdiagram of FIG. 4B with respect to the limiting signals 80, if the LEDs 72 are disposed at the LED coordinates 82 as illustrated in the upper subdiagram of FIG. 4B. If a light signal is detected within the scan area, i.e. within the aperture 74, as is the case in the upper subdiagram of FIG. 4B at the coordinate 84, this results in further light signals 86 as illustrated in the lower subdiagram of FIG. 4B. Particularly by the temporal position of the limiting signals 80 caused by the reference light sources 72 and/or the LEDs, both a frequency and a phase and, in the case of known dimensions of the aperture 74, also an amplitude of the oscillation of the micro scanner mirror 14 may be concluded without the micro scanner mirror itself having to be controlled accordingly by a defined phase, amplitude or frequency signal. Thus, a very simple detection of the oscillation of the micro scanner mirror 14 is possible.

Figure 5:
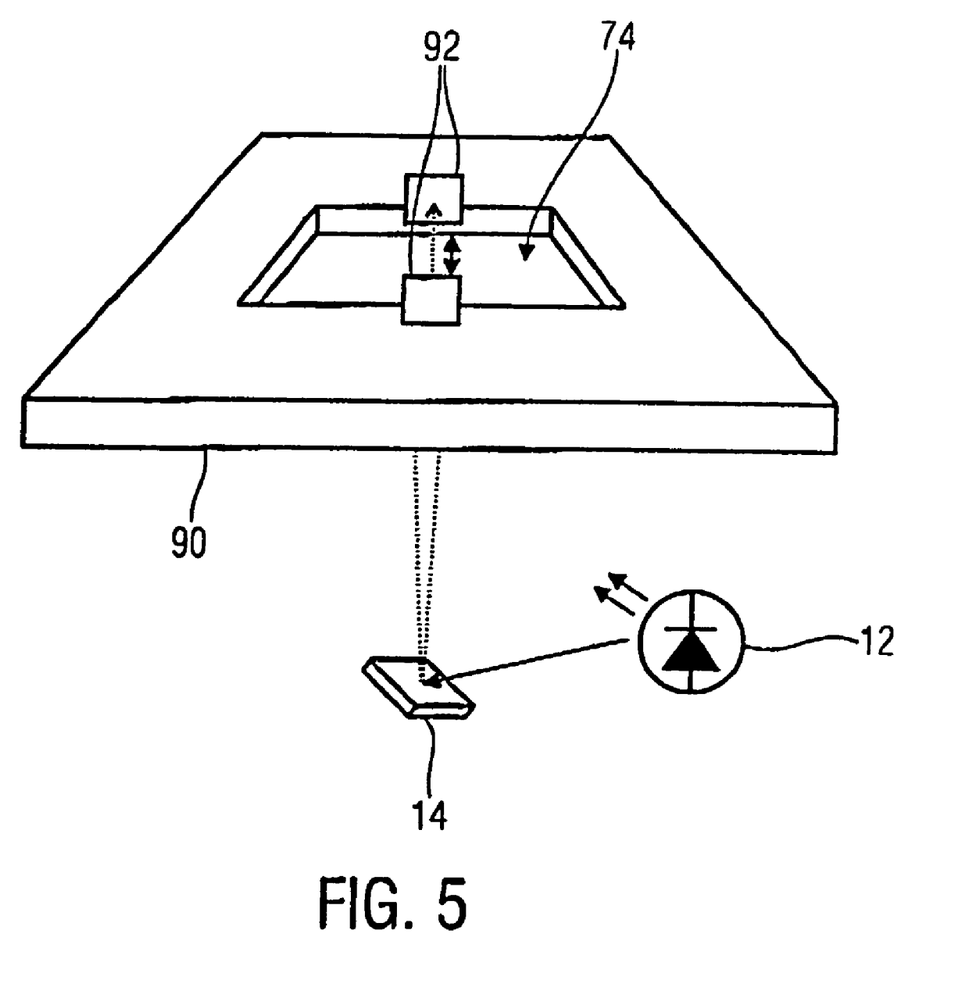
FIG. 5 shows an embodiment for a shutter for the projector.

Analogously, also the one-dimensional oscillation of the micro scanner mirror 14 of the projector 10 as illustrated in FIG. 1 may be detected by a corresponding shutter as illustrated, for example, in FIG. 5. However, light sending and light detecting elements are accordingly exchanged for this, so that photodiodes 92 and/or other corresponding suitable light detectors are disposed on an inner edge of the corresponding shutter 90, receiving an impingement of the light beam 20 from the light source 12 (for example a laser beam from a laser diode) and evaluating it analogously to FIG. 4B to acquire an oscillation amplitude, an oscillation frequency and an oscillation phase of the micro scanner mirror 14 of the projector 10. The concrete design of the shutter of the projector may be constructed analogously to the shutter of the collector.

Figures 6A, 6B:
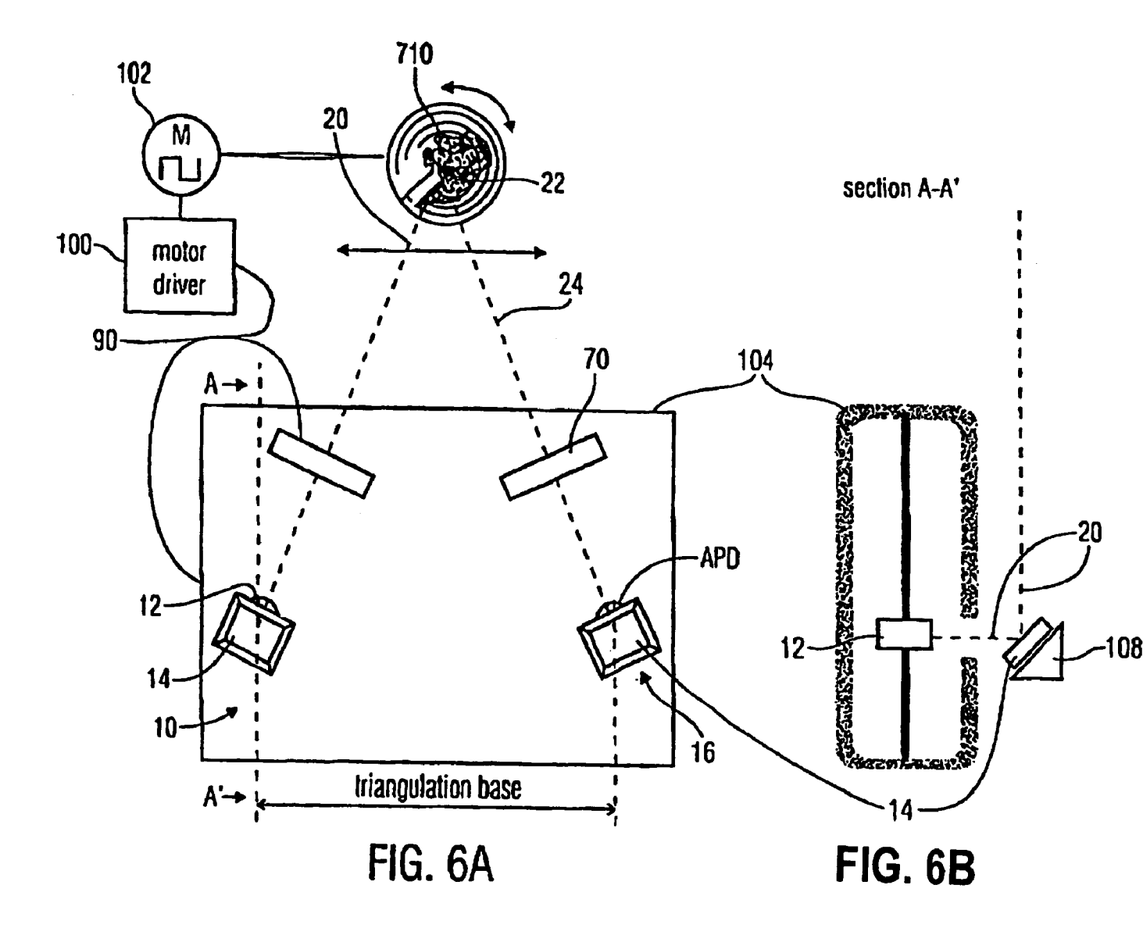
FIG. 6a shows a plan view of a further embodiment of the inventive scanner using the shutters illustrated in FIGS. 4a and 5.
FIG. 6b shows a sectional illustration of the further embodiment corresponding to a section at the intersection line AA'.

FIG. 6A shows a plan view of an embodiment of the inventive scanner using one shutter for each of the projector and the collector.

At the collector, a framelike shutter provided with LEDs according to FIG. 4A whose sides are individually controllable and/or changeable with respect to their brightness and limit the field of view of the collector is used for this. If this Lissajous figure passes a switched-on LED, this results in a sensor signal (i.e. limiting signal) from which, with known position of the LEDs, the amplitude and phase position of the oscillation of the collector mirror may be calculated. Furthermore, another advantage may be achieved, for example, by the implementation of different colors of the corresponding LEDs with respect to a light color of a reflection to be detected of an illuminated place and/or driving of different strength and thus brightness of different strength, because thereby also a spot position in immediate proximity to the aperture 74 may be detected uniquely and without a doubt. Also, for example by switching LEDs (or LED lines) on the respective shutter edges on and off, a phase of the oscillation may be detected. Also, if several LEDs (or other light sources such as laser diodes or light guide ends) are used per shutter edge side, an exact position determination may be performed by a differently adjusted brightness of the individual LEDs and/or the other light sources on the respective shutter edge. Furthermore, two opposing light sources may also differ by different brightness or wavelength of the emitted light, and thereby an exact phase determination of a movement and/or oscillation of the "scan beam" may be determined.

A similar shutter is attached to the projector which, however, carries two opposing photodiodes instead of the LEDs, which, when illuminated by the spot, provide a signal serving to calculate amplitude and phase of the y oscillation of the projector micro mirror and, at the same time, limiting the displacement of the spot.

FIG. 6A thus shows a light source 12 which may output a light beam perpendicular to the drawing plane which is projected onto the shutter 90 by the micro scanner mirror 14 of the projector 10 and is subsequently projected onto the object 710 rotatable by a motor driver 100 and a motor 102. This results in a light spot 22 whose reflection 24 is projected through the shutter 70 of the collector, the micro scanner mirror 14 and the light detector APD disposed below the micro scanner mirror 14. The motor driver 100 may be controlled by the scanner with the projector 10 and the collector 16 such that a surface relief of the object 710 may be completely detected.

FIG. 6B shows a cross-sectional illustration along a section line between the points A and A' illustrated in FIG. 6A. A housing 104 is illustrated enclosing the scanner. Within the housing 104, a conductor plate 106 is disposed on which the light source 12, for example the laser diode, is mounted. The light source 12 outputs a light beam 20 which is reflected at the micro scanner mirror 14. FIG. 6B further illustrates a stimulating unit 108 for the micro scanner mirror 14 which correspondingly stimulates the micro scanner mirror 14 to a one-dimensional oscillation.

Figure 6C:
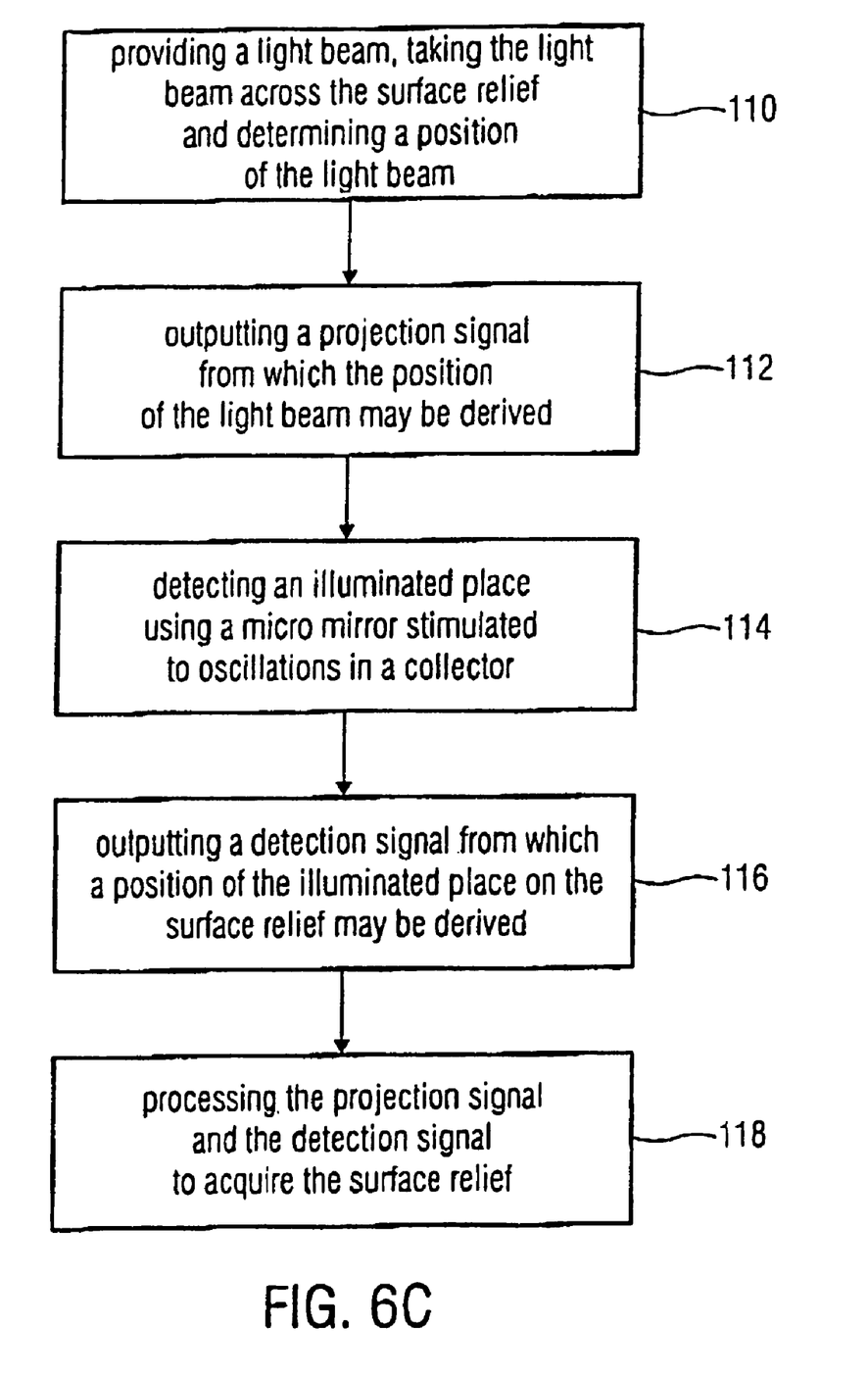
FIG. 6c shows a flowchart of an embodiment of the inventive method for operating a scanner.

FIG. 6C shows an embodiment of the inventive method for operating a scanner. A first step 110 involves providing a light beam, taking the light beam across the surface relief and determining a position of the light beam in an illumination line in which the light beam is taken across the surface relief.

A second step 112 involves outputting a projection signal from which the position of the light beam in the illumination line may be derived.

Subsequently, a third step 114 involves detecting an illuminated place of the surface relief using a micro mirror in the collector stimulated to oscillations.

A fourth step 116 involves outputting a detection signal from which a position of the illuminated place on the surface relief may be derived. A final step 118 of the embodiment of the inventive method involves processing the projection signal and the detection signal to acquire the surface relief therefrom.

In summary, it may be said that a novel 3D scanner is disclosed herein provided with a projector (preferably with a point-shaped light source and a micro scanner mirror) and a collector, wherein the collector includes a micro scanner mirror and a point-shaped light detector on which a reflection of a light point from a surface relief of an object to be detected may be projected by the micro scanner mirror. Further, a corresponding electronic circuit with an interface to a host computer for controlling and further processing of the obtained data may be provided. Furthermore, a method for stimulating the two micro scanner mirrors of the 3D scanner is disclosed herein such that the spot generated by the projector micro scanner mirror may actually be found in the detection area via the collector micro scanner mirror and the light detector, by way of the projector mirror oscillating only in a direction perpendicular to the triangulation plane with a defined frequency and amplitude, the collector micro mirror being stimulated preferably synchronously and with the same amplitude preferably also perpendicular to the triangulation plane, and the collector mirror furthermore performing a second oscillation in the triangulation plane at the same time to detect the displacement of the spot caused by the measuring principle.

Furthermore, a device, for example for the 3D scanner, is disclosed herein, preferably allowing a synchronization of the oscillations of both mirrors in the direction perpendicular to the triangulation plane according to the stimulation method, consisting of a shutter with photodiodes in the optical train of the projector and/or a shutter designed analogously but provided with LEDs in the optical train of the collector by which signals on the momentary amplitudes and phases of one or both oscillations of the micro scanner mirrors may be obtained. Furthermore, an electronic circuit is disclosed which may influence the control of the mirrors in a regulating way, for example to influence control of the frequency, phase or amplitude of a stimulation of a micro mirror, for example to increase a line density of the Lissajous figure and thereby increase the probability of finding the reflection of the light point.

The invention described herein therefore has the advantage of being able to operate without area or line camera so that no area or line image sensors and no corresponding associated complex mapping optics are required. Furthermore, a micro scanner mirror is small, mechanically robust and may be manufactured at a low price, whereby the central advantages of the present invention present themselves in a reduction of the space requirements and the manufacturing costs as well as an increase in mechanical robustness. The described circuit for processing a faint light signal further allows an increase in resolving power. Thus, the described 3D scanner may continue to be constructed in a spatially very compact way. The required signal processing, for example the detection of the laser spot in the sensor data stream, may, at least in part, be realised in hardware and may, for example, be integrated in the scanner, whereby the corresponding computational effort for processing the obtained data to a controlling host computer may be significantly reduced and thus the detection of the surface relief of the corresponding object may be significantly accelerated and the complexity of corresponding algorithms to be performed in the host computer becomes possible. Thus, image processing operations for the extraction of areas of interest from a 2D image are not necessary.

Depending on the circumstances, the inventive method for operating a scanner may be implemented in either hardware or software. The implementation may be carried out on a digital storage medium, particularly a disk or CD with control signals that may be read out electronically, which may cooperate with a programmable computer system so that the corresponding method is performed. Generally, the invention thus also consists in a computer program product with a program code stored on a machine readable carrier for performing the inventive method, when the computer program product runs on a computer. In other words, the invention may thus be realised as a computer program with a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A scanner for providing a possibility of detecting a surface relief of an object, comprising:
   a projector configured to guide a light beam in an illumination line over the surface relief to obtain an illuminated location on the surface relief, the projector being also configured to output a projection signal from which a position of the light beam in the illumination line is derivable; and
   a collector having a collector micro mirror stimulatable to oscillate in two dimensions and a point-shaped light detector, the collector micro mirror being oscillatingly arranged in a first direction of the illumination line and in a second direction differing from the first direction such that a reflection of the illuminated location within the scan area of the collector micro mirror is imagable by it onto the point-shaped light detector, and the collector being configured to output a detection signal from which a position of the illuminated location in the first and second direction is derivable.

2. The scanner according to claim 1, wherein the projector includes a point-shaped light source and a projector micro mirror stimulatable to one-dimensional oscillations.

3. The scanner according to claim 1, further comprising a signal processing unit configured to detect the surface relief based on the projection signal, the detection signal and a known geometrical arrangement of the projector and the collector to each other.

4. The scanner according to claim 3, wherein the signal processing unit is implemented at least partly in hardware.

5. The scanner according to claim 1, wherein the point-shaped light detector comprises an avalanche photodiode APD, the collector further including a transimpedance amplifier, a low pass, a voltage amplifier and an analog-to-digital transducer, which are coupled to the avalanche photodiode.

6. The scanner according to claim 1, wherein the projector and the collector are coupled such that guiding the light beam in the illumination line is synchronizable with an oscillation of the collector micro mirror in the first direction of the illumination line.

7. The scanner according to claim 1, wherein the projector includes a shutter for defining the illumination line, the shutter including an optical sensor which is arranged such that information on a position of the light beam in the illumination line may be established when performing a light beam movement, and the projector further being configured to form the projection signal on the basis of the information established.

8. The scanner according to claim 1, wherein the collector comprises a shutter for defining a scan area, the shutter including a reference light source which is. arranged such that, when the collector micro mirror oscillates, a light beam from the reference light source is deflected onto the light detector and the light detector is configured to output, when receiving the light beam from the reference light source, a reference signal from which information on an oscillating behavior of the collector micro mirror is derivable, the collector further being configured to determine the detection signal on the basis of the information on the oscillating behavior of the collector micro mirror.

9. The scanner according to claim 8, further including an oscillation-stimulating unit for stimulating an oscillation of the collector micro mirror and a control unit, the control unit being configured to control an oscillation frequency, an oscillation amplitude or an oscillation phase of the collector micro mirror oscillation in dependence on the reference signal.

10. A method for operating a scanner for providing a possibility of detecting a surface relief of an object, the scanner
   comprising a projector configured to guide a light beam in an illumination line over the surface relief to obtain an illuminated location on the surface relief, the projector being further configured to output a projection signal from which a position of the light beam in the illumination line is derivable; and
   comprising a collector having a collector micro mirror stimulatable to oscillate in two dimensions and a point-shaped light detector, the collector micro mirror being oscillatingly arranged in a first direction of the illumination line and in a second direction differing from the first direction such that a reflection of the illuminated location within a scan area of the collector micro mirror is imagable by it onto the point-shaped light detector, and the collector being configured to output a detection signal from which a position of the illuminated location in the first and second directions is derivable,
   wherein the method comprises the following steps:
   providing and guiding, in the shape of lines, the light beam in an illumination line over the surface relief of the object to obtain an illuminated location on the surface relief, the step of guiding the light beam also including determining a position of the light beam in the illumination line and outputting a projection signal from which the position of the light beam in the illumination line is derivable; and
   detecting a position of the illuminated location using the collector micro mirror stimulated to oscillate in two dimensions and the point-shaped light detector, the step of detecting including imaging a reflection of the illuminated location onto the light detector by the collector micro mirror oscillating in the first and second directions, and the step of detecting also including outputting a detector signal from which the position of the illuminated location in the first and second directions is derivable.

11. The method according to claim 10, further comprising the step of:
   processing the projection signal and the deflection signal to provide a possibility of detecting the surface relief of the object.

12. A computer readable medium having a computer program for performing a method for operating a scanner for providing a possibility of detecting a surface relief of an object, the scanner
   comprising a projector configured to guide a light beam in an illumination line over the surface relief to obtain an illuminated location on the surface relief, the projector being further configured to output a projection signal from which a position of the light beam in the illumination line is derivable; and
   comprising a collector having a collector micro mirror stimulatable to oscillate in two dimensions and a point-shaped light detector, the collector micro mirror being osciltatingly arranged in a first direction of the illumination line and in a second direction differing from the first direction such that a reflection of the illuminated location within a scan area of the collector micro mirror is imagable by it onto the point-shaped light detector, and the collector being configured to output a detection signal from which a position of the illuminated location in the first and second directions is derivable, wherein the method comprises the following steps:
providing and guiding, in the shape of lines, the light beam in an illumination line over the surface relief of the object to obtain an illuminated location on the surface relief, the step of guiding the light beam also including determining a position of the light beam in the illumination line and outputting a projection signal from which the position of the light beam in the illumination line is derivable; and
detecting a position of the illuminated location using the collector micro mirror stimulated to oscillate in two dimensions and the point-shaped light detector, the step of detecting including imaging a reflection of the illuminated location onto the light detector by the collector micro mirror oscillating in the first and second directions, and the step of detecting also including outputting a detector signal from which the position of the illuminated location in the first and second directions is derivable, when the computer program runs on a computer.

* * * * *